(12) United States Patent
Mcleod et al.

(10) Patent No.: US 11,708,849 B2
(45) Date of Patent: Jul. 25, 2023

(54) LOCKING SYSTEM FOR INDUSTRIAL MACHINE AND METHOD FOR OPERATING THE SAME

(71) Applicant: SSI Shredding Systems, Inc., Wilsonville, OR (US)

(72) Inventors: Robert Mcleod, Aurora, OR (US); Thomas Garnier, Wilsonville, OR (US); Todd Sears, Wilsonville, OR (US)

(73) Assignee: SSI Shredding Systems, Inc., Wilsonville, OR (US)

( * ) Notice: Subject to any disclaimer, the term of this patent is extended or adjusted under 35 U.S.C. 154(b) by 376 days.

(21) Appl. No.: 16/945,044

(22) Filed: Jul. 31, 2020

(65) Prior Publication Data

US 2021/0033140 A1 Feb. 4, 2021

Related U.S. Application Data

(60) Provisional application No. 62/882,132, filed on Aug. 2, 2019.

(51) Int. Cl.
| | |
|---|---|
| *F16B 39/10* | (2006.01) |
| *B02C 4/30* | (2006.01) |
| *B02C 18/18* | (2006.01) |
| *B02C 18/00* | (2006.01) |
| *B02C 4/10* | (2006.01) |

(52) U.S. Cl.
CPC ............... *F16B 39/10* (2013.01); *B02C 4/30* (2013.01); *B02C 18/18* (2013.01); *B02C 4/10* (2013.01); *B02C 18/0007* (2013.01)

(58) Field of Classification Search
CPC ....... B02C 18/14; B02C 18/146; B02C 18/16; B02C 18/18; B02C 18/182
See application file for complete search history.

(56) References Cited

U.S. PATENT DOCUMENTS

| | | | | |
|---|---|---|---|---|
| 3,638,974 | A * | 2/1972 | Stratienko | F16D 1/094 403/370 |
| 5,360,283 | A * | 11/1994 | Browning | F16D 1/095 403/374.4 |
| 2002/0047062 | A1* | 4/2002 | Keskula | B02C 18/144 241/294 |
| 2017/0284473 | A1* | 10/2017 | Story | F16D 1/05 |

FOREIGN PATENT DOCUMENTS

EP 1749577 A1 * 2/2007 ........... B02C 18/146

\* cited by examiner

*Primary Examiner* — Shelley M Self
*Assistant Examiner* — P Derek Pressley
(74) *Attorney, Agent, or Firm* — McCoy Russell LLP

(57) ABSTRACT

A locking system in an industrial machine is provided. The locking system includes a lock-ring positioned in a lock-ring recess in a rotational shaft, a spacing plate axially interfacing with the lock-ring, and a compression plate with a threaded opening. The locking system further includes a bolt threadingly engaged with the threaded opening in the compression plate and a spring axially interposed between the spacing plate and the compression plate.

15 Claims, 12 Drawing Sheets

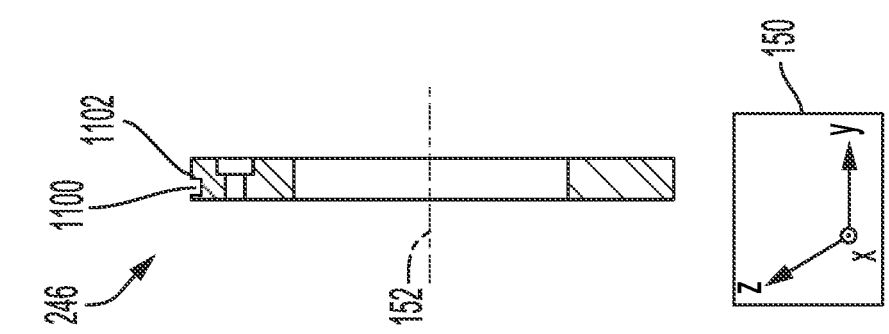
FIG. 12
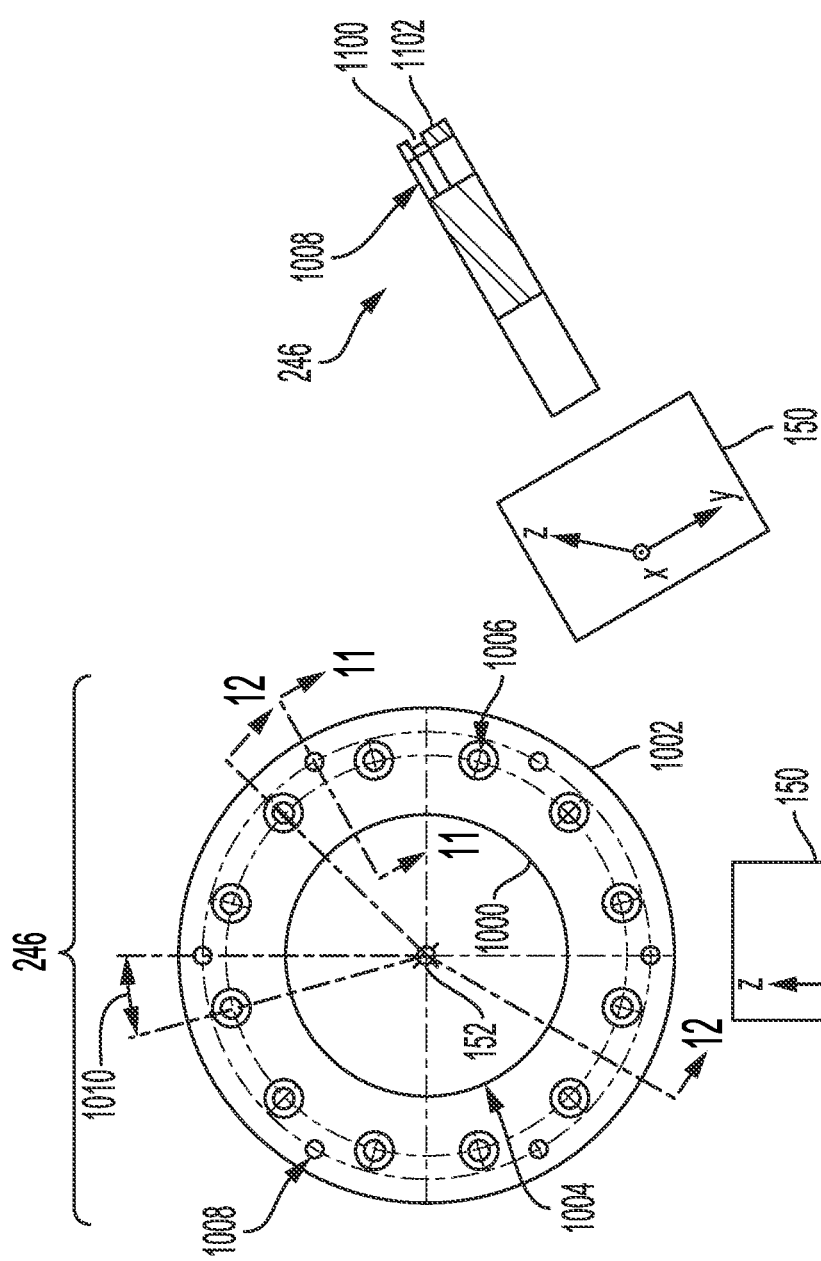
FIG. 11
FIG. 10

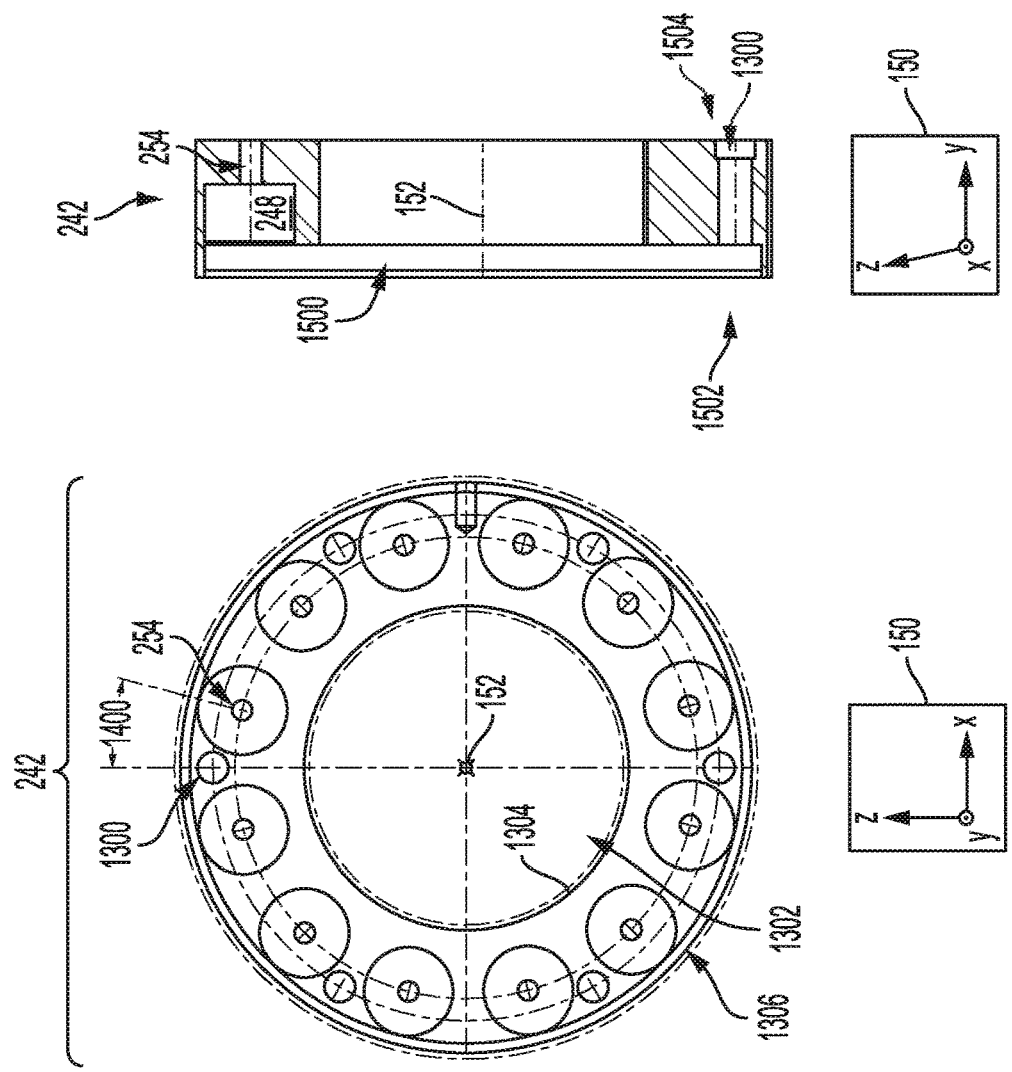
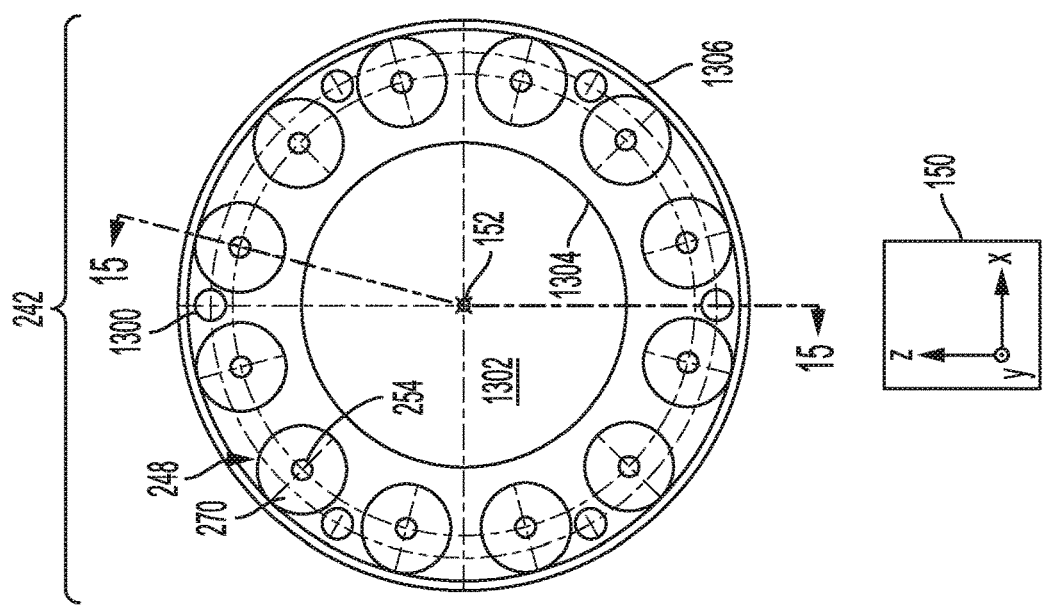

LOCKING SYSTEM FOR INDUSTRIAL MACHINE AND METHOD FOR OPERATING THE SAME

CROSS-REFERENCE TO RELATED APPLICATION

The present application claims priority to U.S. Provisional Application No. 62/882,132, entitled "LOCKING SYSTEM FOR INDUSTRIAL MACHINE AND METHOD FOR OPERATING THE SAME", and filed on Aug. 2, 2019. The entire contents of the above-listed application are hereby incorporated by reference for all purposes.

BACKGROUND

Industrial machines commonly use components attached to rotating shafts to perform a variety of functions. The rotational shafts experience elevated loads (e.g., shear loading, torsional loading, etc.) during machine operation, which can lead to shaft flexion. Industrial reducing machines with cutters on rotating shafts are, for example, particularly susceptible to shaft flexion.

In some machines, such as primary reducers, the cutters are welded onto the shaft to increase the strength of the cutter-shaft interface. The welded cutter-shaft interface may be able to handle the relatively high stresses put on the shaft during machine operation. However, increasing the cutter load carrying capacity via the welded interface may come at the cost of diminishing reducer adaptability.

In other machines, such as shredders with cutters removably coupled to the shafts, shaft flexion causes the cutters and spacers on the shaft to loosen resulting in unwanted cutter degradation and which ultimately may necessitate cutter repair or replacement. For example, processed material may find its way into the interface between the shaft and cutters. The aberrant material loosens the cutters and causes wear at the interface. When the cutter stack develops play, the cutter's shear gap may also exceed a desired value. The unwanted cutter shear gap degrades shearing operation, and leads to premature cutter wear and in some instances cutter binding, deformation, etc.

Prior clamping devices threading onto a non-drive side of the shaft reduce play in the cutters and spacers on the shafts. These types of threaded clamping devices commonly require complex installation and servicing procedures. More recently, shredding machines have incorporated threadless locking systems to prevent the cutters and the spacers from coming loose on the shaft. The locking systems exert a clamping force on a bearing plate to clamp the stack on the shaft. However, the cutter locking systems require precise bolt torque to function as desired. Exceeding bolt torque thresholds can cause machine damage, such as shaft shoulder deformation, bolt deformation, etc. Conversely, under-torqueing the cutter stack creates unwanted axial stack play. Therefore, in practice, the locking system's performance may suffer due to installation errors.

Furthermore, many industries have evolving material processing requirements, resulting in a need for machine adaptability (e.g., removable shaft cutters). However, previous attempts to incorporate removable cutters into reducing machines have been at odds with machine durability. Previous reducing machine designers have attempted to balance unwanted tradeoffs between these characteristics, each of which affect the customer's bottom line due to a reduction in machine throughput. Therefore, previous industrial reducing machines have fallen short of achieving some of the end-user goals related to machine durability, maintenance, and adaptability. Thus, there is an unmet need for alternate shaft locking mechanisms.

SUMMARY

To address at least some of the issues with previous industrial machines, a locking system for an industrial machine is provided. The locking system includes a lock-ring positioned in a lock-ring recess in a rotational shaft, a spacing plate axially interfacing with the lock-ring, and a compression plate axially interfacing with components on the rotational shaft. The locking system also comprises a spring axially interposed between a spring retainer spacing plate and the compression plate. When installed, the locking system exerts an axial preload on a cutter stack mounted on the rotational shaft. The axial preload is applied to the components on the rotational shaft, such as a cutter stack in a reducing machine.

In one example, the preload may be achieved using the following installation sequence. Initially, a bolt threaded in a compression plate is torqued to compress the spring, decreasing a gap between the compression plate and the spring retainer. Next, additional locking system components are installed on the rotational shaft. Subsequently, the bolt is unthreaded from the compression plate to release spring compression. This allows for spring compression and then spring release to achieve a desired amount of cutter stack preloading. As a result, installation efficiency of the locking system is increased and the likelihood of improper installation (e.g., exerting an unwanted preload on the cuttings stack) is reduced (e.g., eliminated).

In another example, the preload applied to the cutter stack may be increased by torqueing the bolt threaded in the compression plate. Conversely, in such an example, the preload applied to the cutter stack may be decreased by unthreading the bolt from the compression plate to decrease cutter stack clamping. Consequently, the machine can achieve a targeted amount of stack clamping by directly threading and unthreading the bolt from the compression plate.

In another example, the rotational shaft includes a section having a polygonal shape, such as a hexagonal shape, which mates with an aperture in the cutters having a corresponding polygonal shape. The mated polygonal shapes allow components, such as cutters, to be efficiently installed and removed from the shaft. Thus, the machine's modularity is increased when a polygonal interface between the rotational shaft and the cutters is employed.

To the accomplishment of the foregoing and related ends, certain illustrative aspects of the system are described herein in connection with the following description and the attached drawings. The features, functions, and advantages that have been discussed can be achieved independently in various embodiments of the present disclosure or may be combined in yet other embodiments, further details of which can be seen with reference to the following description and drawings. This summary is provided to introduce a selection of concepts in a simplified form that are elaborated upon in the Detailed Description. This summary is not intended to identify key features or essential features of any subject matter described herein.

BRIEF DESCRIPTION OF THE DRAWINGS

FIG. 10 shows a spring retainer included in the cutter locking system, depicted in FIG. 2.

FIG. 11 shows a first cross-sectional view of the spring retainer, depicted in FIG. 10.

FIG. 12 shows a second cross-sectional view of the spring retainer, depicted in FIG. 10.

FIGS. 13-14 show different axial end views of a compression plate in the cutter locking system, depicted in FIG. 2.

FIG. 15 shows a cross-sectional view of the compression plate, shown in FIGS. 13-14.

FIGS. 2-15 and 18-19 are drawn approximately to scale. However, other relative dimensions may be used, in other embodiments.

DETAILED DESCRIPTION

Figure 1:
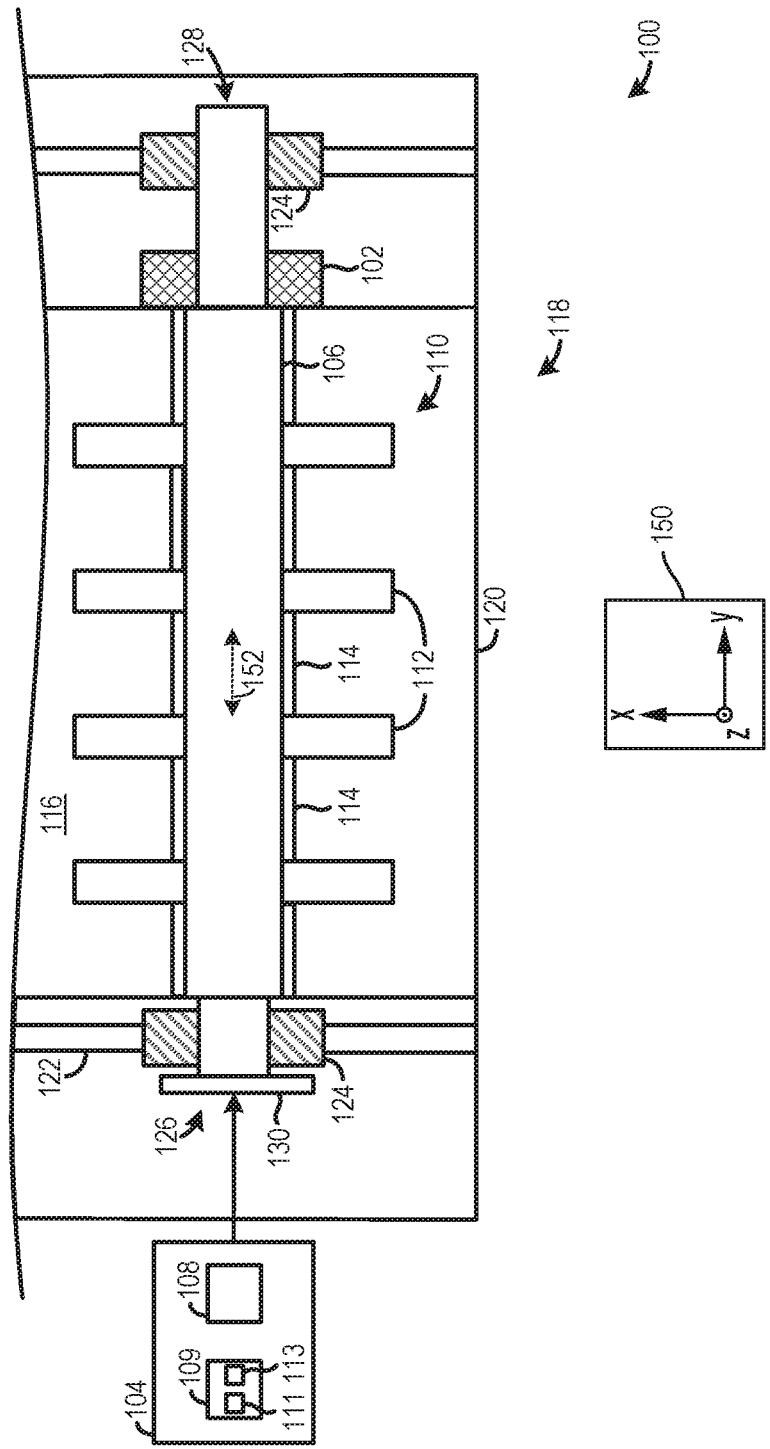
FIG. 1 illustrates a high-level depiction of an industrial reducing machine.

Previous industrial machines have suffered from clamping difficulties. For example, industrial reducers and shredders have experienced cutter stack preloading problems. Prior attempts to clamp cutter stacks have, for instance, required frequent maintenance, precision and/or specialized tooling during clamping device installation, etc. As such, the machines may remain inoperative for significant durations during the machine's lifecycle, decreasing the machine's profitability. For instance, certain shredding machines necessitate large torque wrenches to thread clamping plates onto the rotational shafts to lock the cutter stack into place. Other reducing machines utilizing clamping mechanisms attached to non-threaded portions of the shaft require precise bolt torque to function as intended. If the precise bolt torque is not achieved, the machine may experience premature wear, binding, etc. Furthermore, in certain primary reducing machines stack preloading is avoided by welding the cutters directly to the rotational shaft due to the high loads experienced during material reduction. However, welding the cutters to the shaft drastically reduces the machine's adaptability.

A locking system in an industrial machine designed to reduce (e.g., eliminate) the chance of the system exerting pressure on rotational shaft components outside a desired range is described herein. As a result, the locking system may be efficiently assembled using a procedure which is less susceptible to user error. To achieve these benefits the locking system includes a spring positioned between a compression plate and a spring retainer. The spring is designed to exert an axial preload on a cutter stack installed on the rotational shaft. In one example, during locking system installation, a bolt is threaded into the compression plate, causing a spring retainer to compress the spring. Subsequently, in the system's installation process, the bolt may be unthreaded to release spring compression and exert the axial preload on the cutter stack. The characteristics (e.g., spring constant) of the spring may be adjusted to achieve different target preloads, based on end-use requirements. This allows the preload characteristics to be precisely tailored to the needs of the end-user. In other embodiments, however, the locking system may be designed such that threading the bolt into the compression plate increases axial preloading. In such an example, the spring may delimit an upper limit of axial preload.

Providing a locking system in the machine enables removable cutters to be deployed in the machine even in reducing machines experiencing high loads, such as primary reducers. In one example, the removable cutters and the shaft may form a polygonal interface (e.g., square, hexagonal, octagonal, etc.). The polygonal interface allows the cutters to quickly mate with the shaft in a desired alignment. Further, in one example, a line of symmetry of the cutters may be arranged at a non-perpendicular angle with regard to one of the faces of the polygonal outer surface of the rotational shaft. Designing the cutters in this manner allows for greater cutter clocking variation when compared to cutters that are symmetrically aligned with regard to a face of the shaft.

It may be desirable to avoid arranging different cutters at similar angles on a common shaft to reduce the likelihood of the shaft experiencing loads above a threshold level during machine operation. When the cutters are not symmetrically arranged with regard to polygonal faces of the shaft the cutters may be axially flipped to achieve different cutting blade clocking between two identically shaped cutters. To elaborate, a shaft with a polygonal outer shape using cutters which are not symmetrically aligned with regard to the polygonal shaft allows the number of distinct cutter positions to be doubled, if wanted. As such, in one use-case example, a cutter with a hexagonal interface having the cutter blades offset from the hexagonal faces may achieve twelve distinct cutter positions. The offset cutter arrangement increases the adaptability of the industrial reducing machine, further increasing customer satisfaction.

Figure 2:
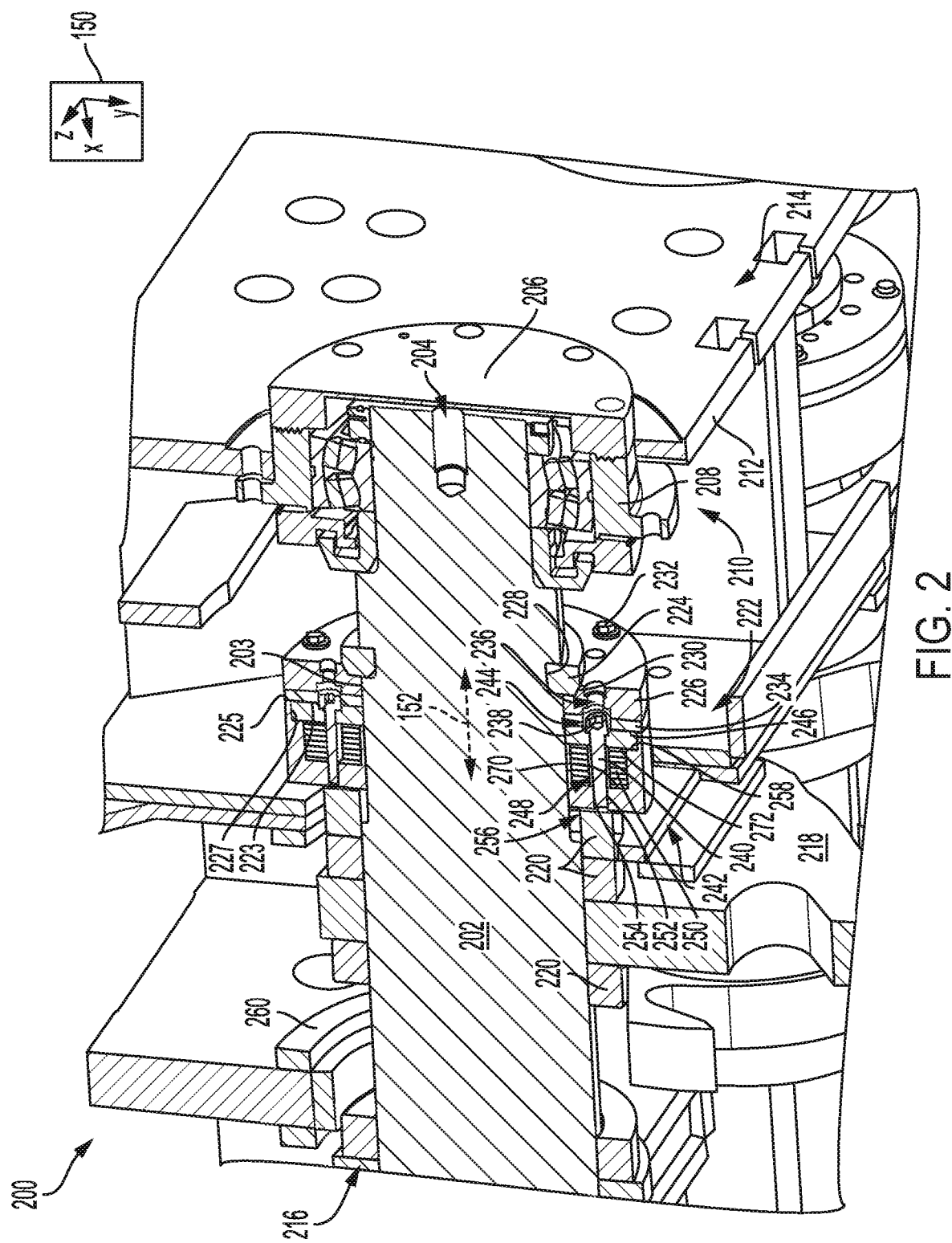
FIG. 2 shows a detailed view of an example of an industrial reducing machine with a cutter locking system clamping a cutter stack on a rotational shaft.
Figure 3:
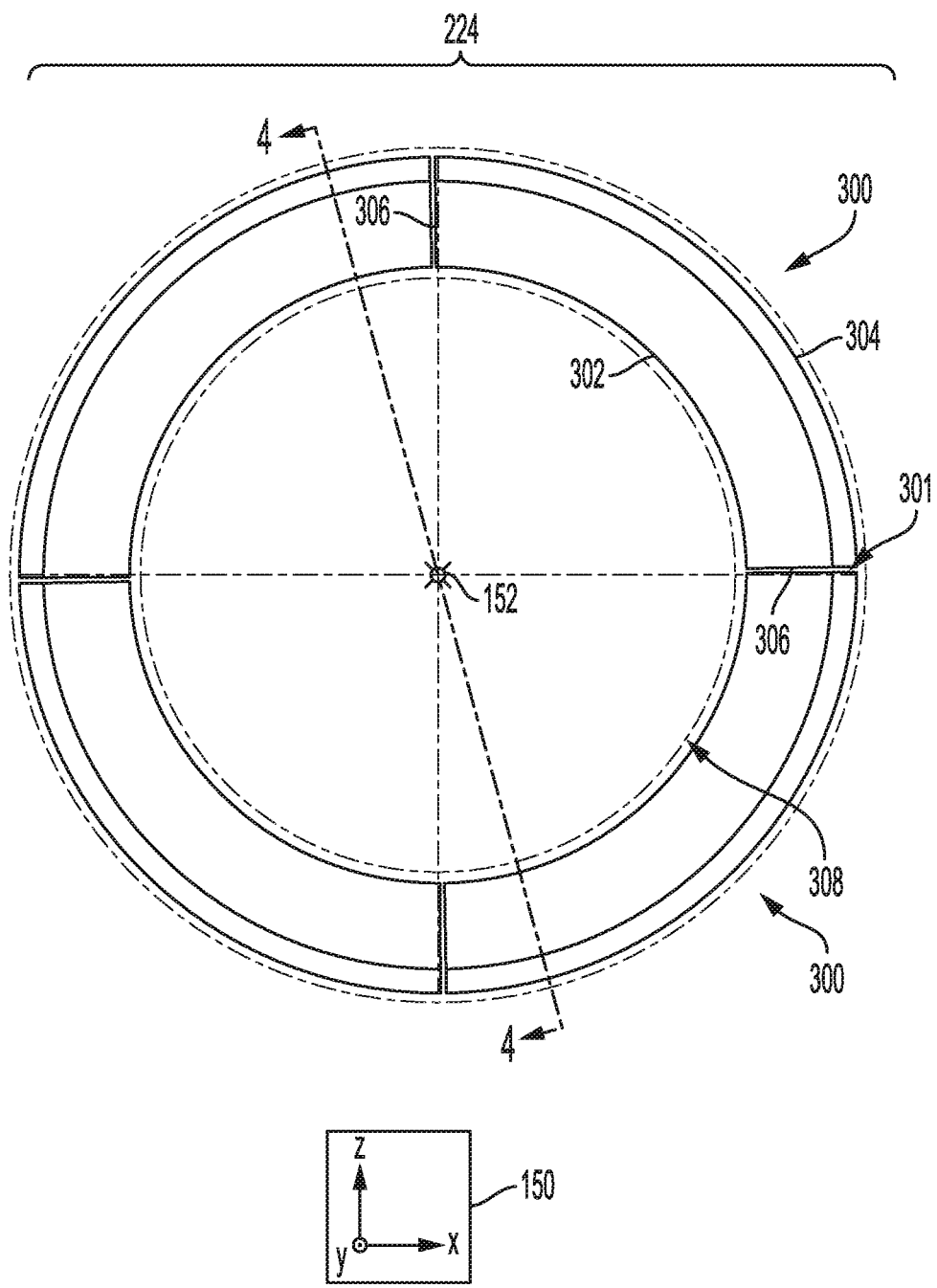
FIG. 3 shows a lock-ring included in the cutter locking system, illustrated in FIG. 2.
Figure 4:
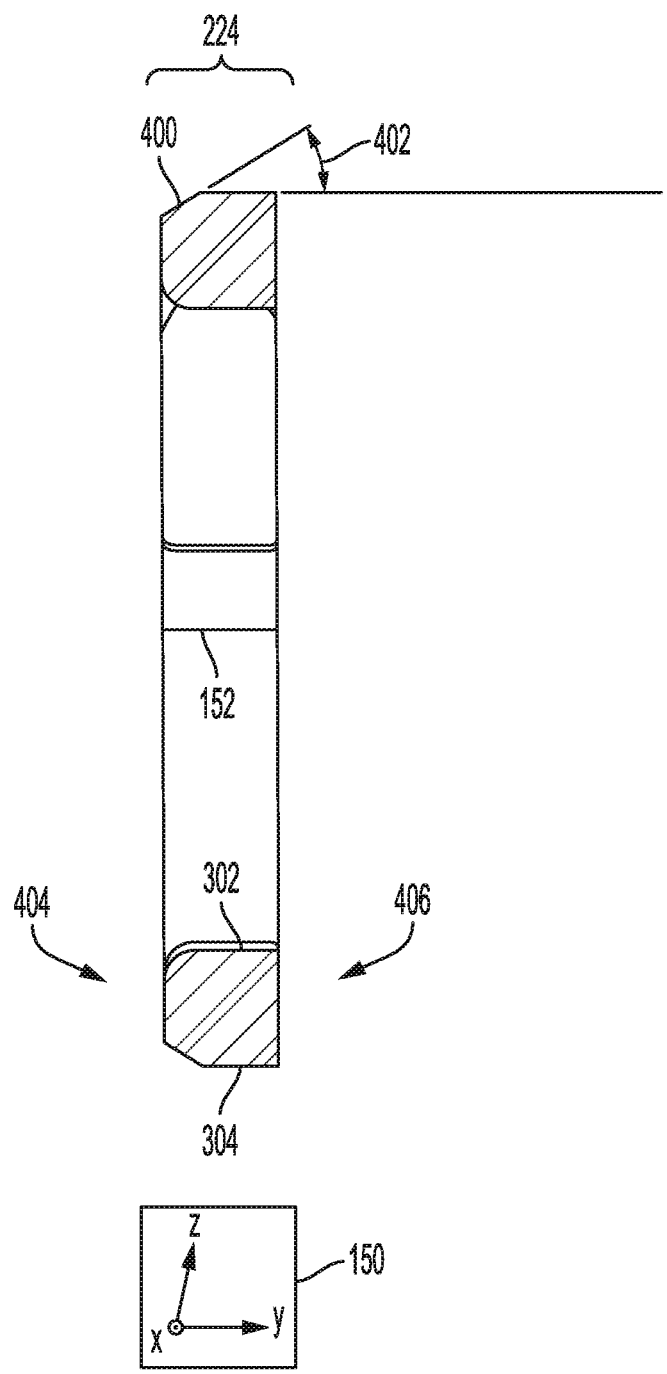
FIG. 4 shows a cross-sectional view of the lock-ring, depicted in FIG. 3.
Figure 5:
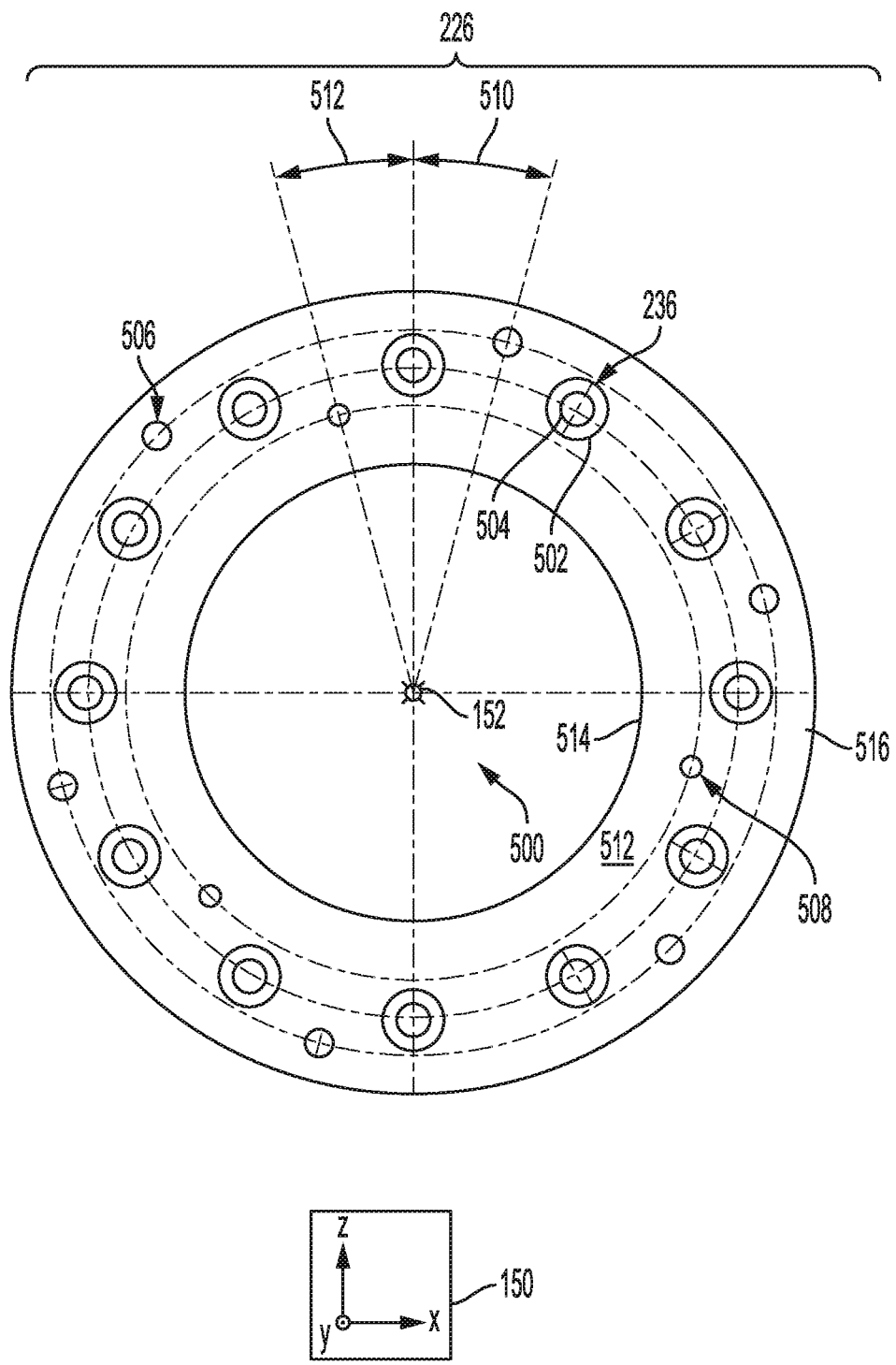
FIG. 5 shows a first axial side of a spacing plate in the cutter locking system, depicted in FIG. 2.
Figure 7:
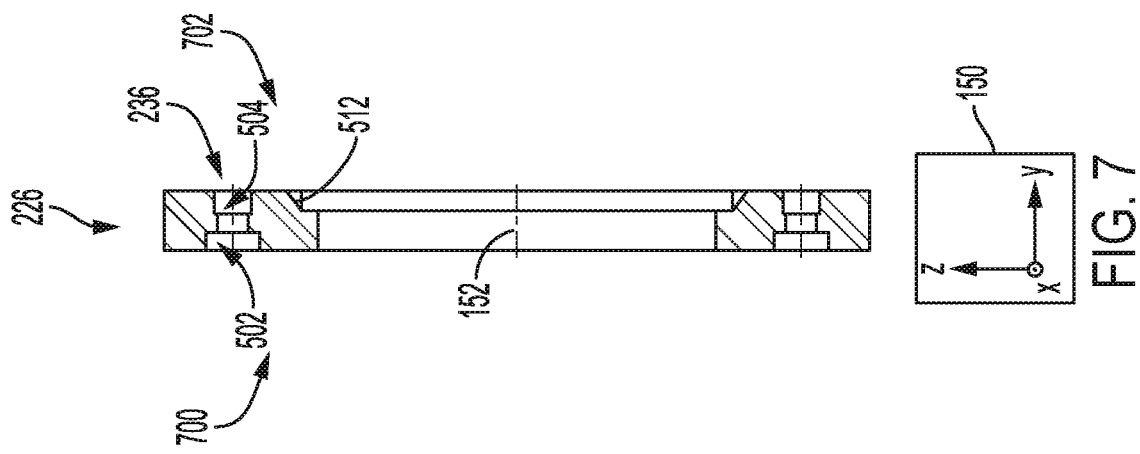
FIG. 7 shows a cross-sectional view of the spacing plate, illustrated in FIG. 5.
Figure 6:
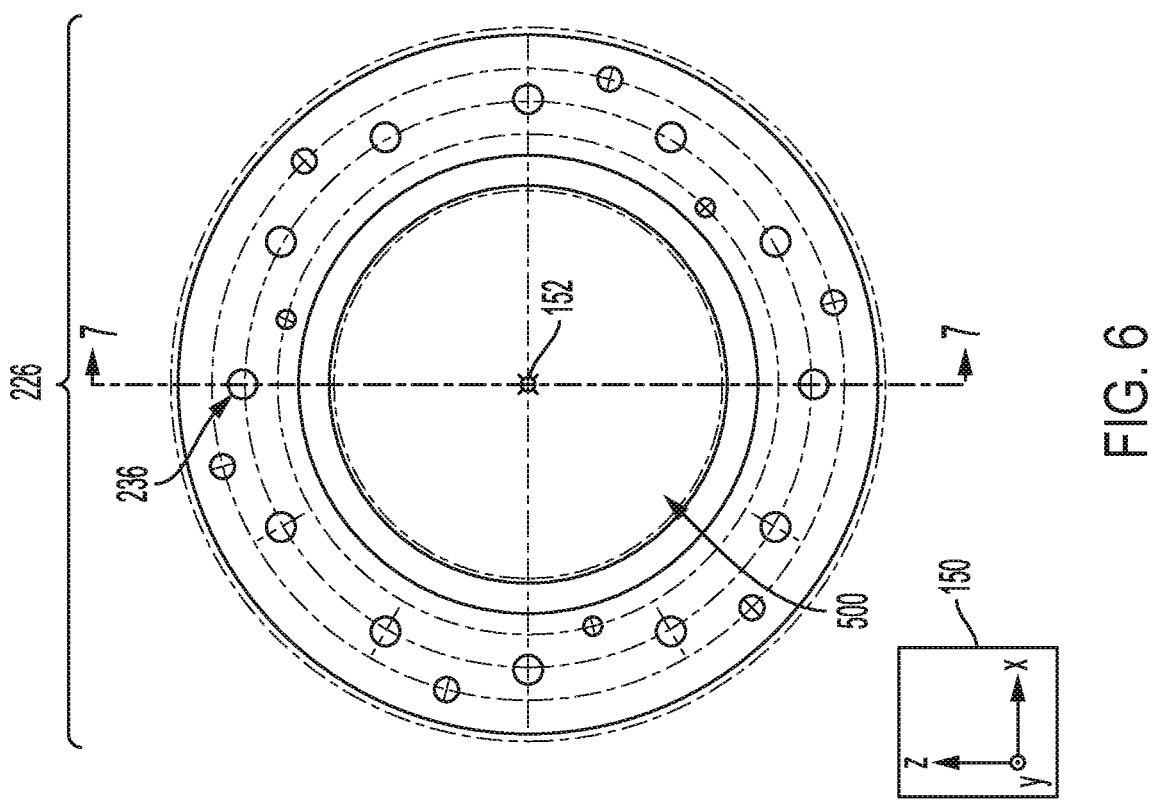
FIG. 6 shows a second axial side of the spacing plate, depicted in FIG. 5.
Figure 9:
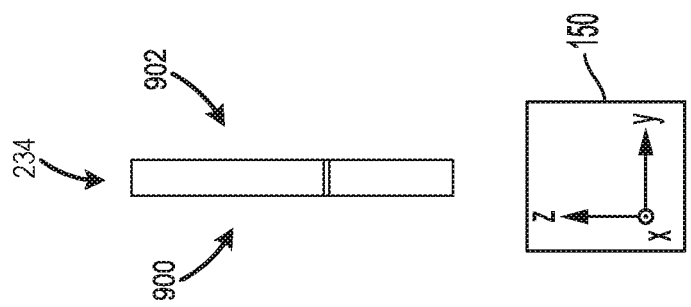
FIG. 9 shows a side view of the shim, illustrated in FIG. 8.
Figure 8:
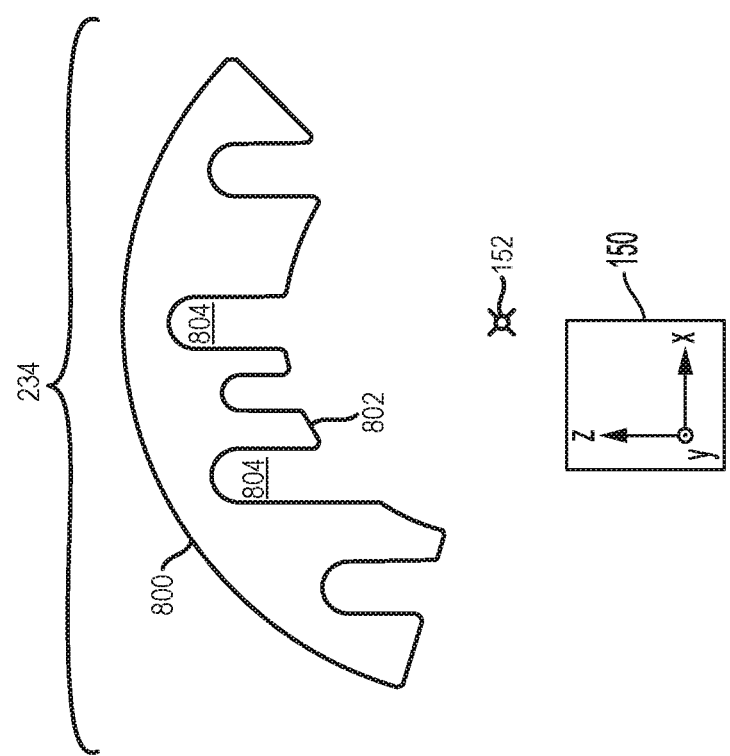
FIG. 8 shows a shim included in the cutter locking system, depicted in FIG. 2.
Figure 16:
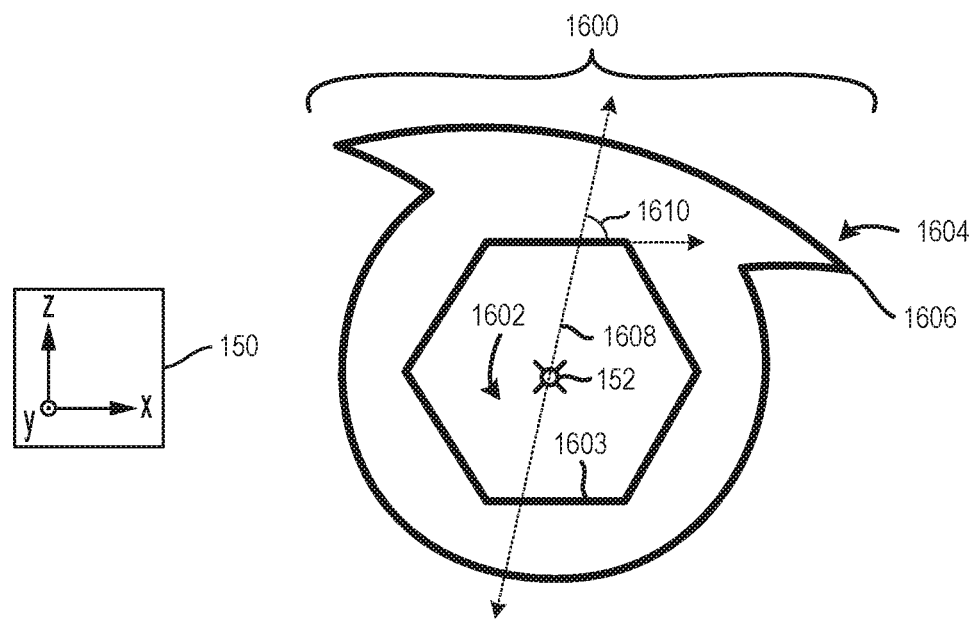
FIG. 16 shows an example of a cutter included in an industrial reducing machine.
Figure 17:
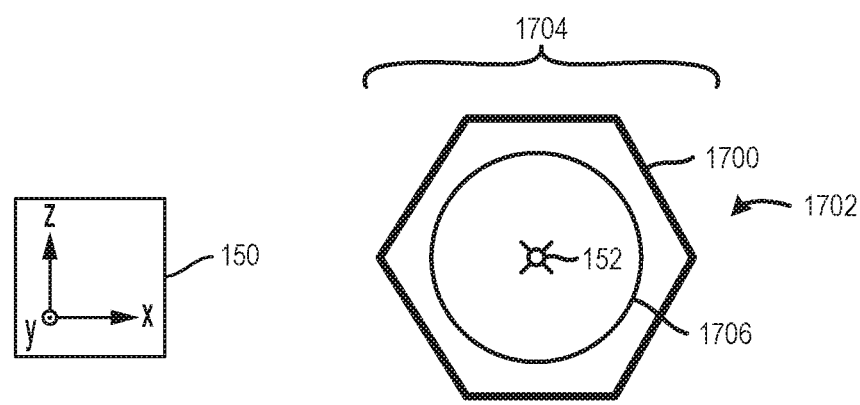
FIG. 17 shows an example of a rotational shaft in an industrial reducing machine.
Figure 18:
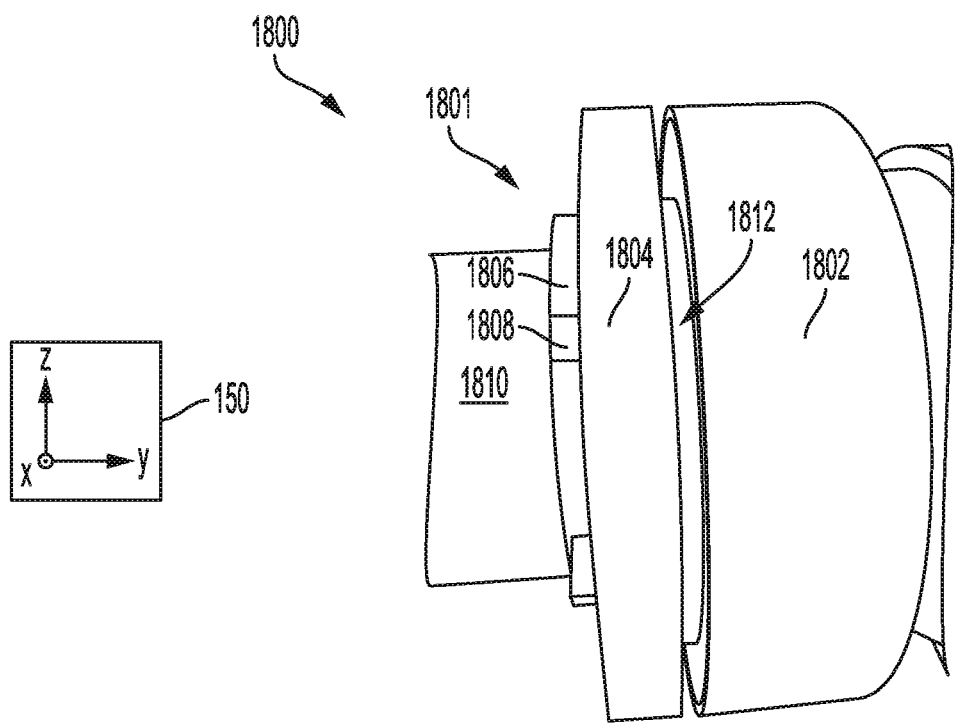
FIGS. 18 and 19 show a use-case installation sequence for a locking system in an industrial reducing machine.
Figure 19:
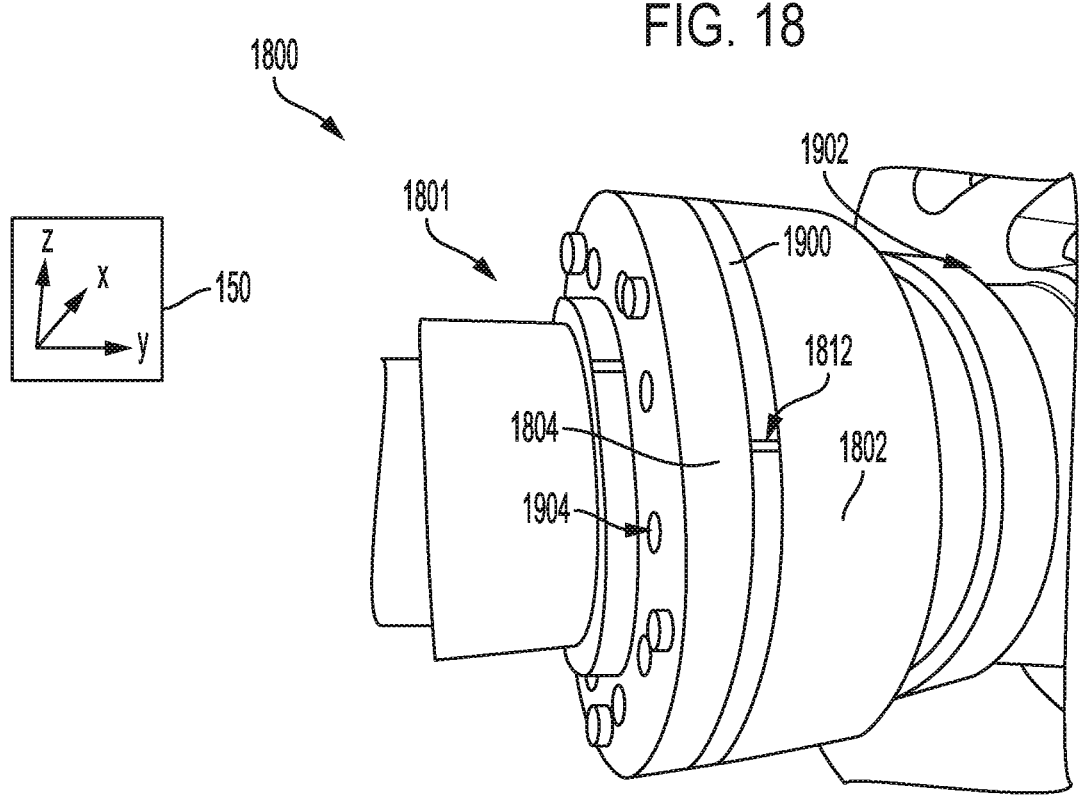
Figure 20:
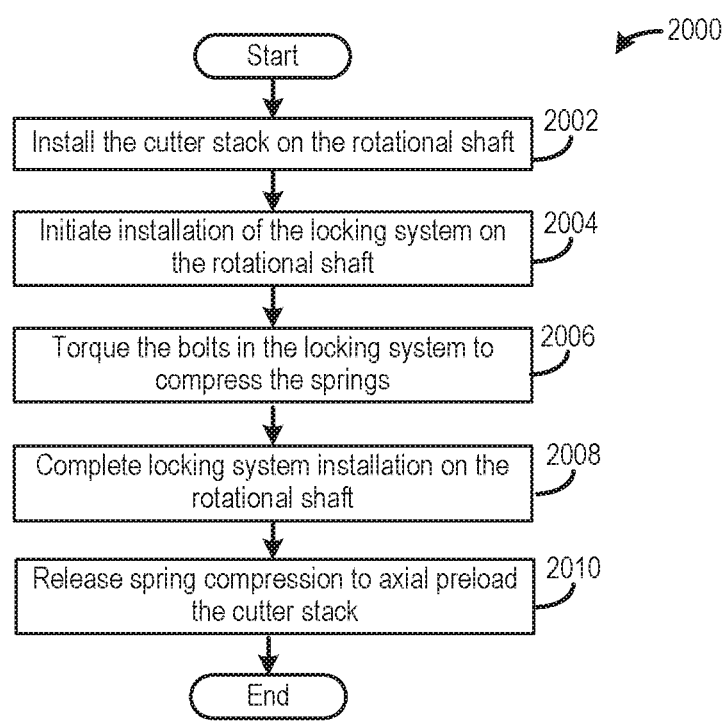
FIG. 20 shows a method for installing a locking system on a shaft of an industrial reducing machine.

FIG. 1 is a high level illustration of an industrial reducing machine with a cutter locking system. FIG. 2 shows a detailed depiction of an example of a reducing machine with a cutter locking system preloading a cutter stack. FIGS. 3-4 show different views of a lock-ring included in the cutter locking system shown in FIG. 2. FIGS. 5-7 show different views of a spacing plate in the cutter locking system shown in FIG. 2. FIGS. 8-9 show different views of a shim included in the cutter locking system, shown in FIG. 2. FIGS. 10-12 illustrate different views of a spring retainer included in the cutter locking system, shown in FIG. 2. FIGS. 13-15 show different views of a compression plate included in the cutter locking system shown in FIG. 2. FIGS. 16-17 show examples of a cutter and a rotational shaft, which may be included in the industrial machines. FIGS. 18-19 show a use-case example of an installation sequence of a cutter locking system on a rotational shaft of an industrial machine. FIG. 20 shows a method for installing a locking system on a rotational shaft of an industrial reducing machine. FIGS. 2-15 and 18-19 are drawn approximately to scale. However, other relative dimensions may be used, in other embodiments.

An axis system 150 is shown in FIG. 1 as well as FIGS. 2-19 to establish a common frame of reference. In one example, the z-axis may be parallel to a gravitational axis, the x-axis may be a lateral axis and the y-axis may be a longitudinal axis. However, other orientations of the axes may be used, in other examples. A rotational axis 152 is additionally provided in FIGS. 1-19, when appropriate. It will be understood that a radial direction with regard to the shaft refers to a direction extending from the rotational axis and arranged perpendicular to the rotational axis. Cross-sectional cutting planes indicating the cross-sectional views in subsequent figures are also indicated where appropriate in the figures.

FIG. 1 depicts an industrial reducing machine 100. As described herein, an industrial reducing machine includes shredding machines and primary reducing machines. Primary reducers may be designed to reduce the volume of tougher materials than shredders. Moreover, shredders utilize shearing to process materials, while the primary reducers process materials via shearing, crushing, piercing, etc. For this reason, primary reducers have larger spacing between shaft cutters than do shredders, which have relatively small shear gaps. The industrial reducing machine 100, as well as the other machines described herein, are designed to process a variety of materials, including but not limited to metals, polymeric materials, forestry products (e.g., lumber, structurally engineered lumber (wood composites, glue-lamination timber, and the like)), medical waste, electronic-waste, hazardous waste, etc.

Although the cutter locking system is described herein with regard to an industrial reducing machine, the cutter locking system may be used in any type of industrial machine with a rotating shaft and a need to axially preload components on the shaft. In such an example, the cutter locking system may be more generally referred to as a locking system.

The general depiction of the machine in FIG. 1 is provided to demonstrate the operating environment in which a cutter locking system 102 of the machine resides. However, the components in the industrial reducing machine 100 may have greater structural complexity than is illustrated in FIG. 1. The machines may have a different component layouts, features, etc., in other embodiments.

A drive assembly 104 is included in the machine 100. The drive assembly 104 is configured to impart rotational energy to a rotational shaft 106. Although a single rotational shaft is illustrated in FIG. 1, the machine may include two or more rotational shafts. In one specific example, the machine may include two rotational shafts with cutters on opposing shafts axially offset from one another.

The drive assembly 104 may include a prime mover 108 (e.g., electric motor, internal combustion engine, combinations thereof, etc.) designed to pressurize hydraulic fluid. The pressurized hydraulic fluid may be delivered to hydraulic motors (not shown) via hydraulic conduits (not shown) extending there between. However, other drive assembly configurations have been envisioned, such as a configuration where a prime mover directly delivers rotational energy to the shafts. For instance, the prime mover may be an electric motor rotationally coupled to the rotational shaft 106. The prime mover 108 is shown spaced away from the rotational shaft 106 in the illustrated example. In other examples, however, the prime mover may be provided in a common structure with the cutting enclosure. The drive assembly 104 may also include a controller 109 designed to implement instructions stored in memory 111 executable by a processor 113. For instance, the controller may carry out various material reduction schemes. In the case of a primary reducer, the reducer may reverse shaft rotation when the torque on the shaft exceeds a threshold value. However, numerous control schemes may be used.

The industrial reducing machine 100 includes a cutter stack 110 with a plurality of cutters 112, and spacers 114 positioned between consecutive cutters. In other embodiments, the cutters 112 may include extensions which axially extend from the cutter bodies and serve as spacing devices. The cutter locking system 102 is designed to exert an axial preload on the cutter stack to enable the stack to maintain a desired alignment during machine operation.

The cutters 112 are included in a processing chamber 116 in which materials are processed. During processing, materials are fed into the chamber 116. In one example, a hopper (not shown) may be provided in the machine to direct materials into the chamber 116. In the processing chamber, the materials are reduced into smaller constituents through the interaction between the cutters, a cutter tray, and the materials. The material constituents will, once processed, travel below the cutters and cutter tray. A catchment bin (not shown) may be provided below the cutting chamber in one example. However, in other examples, a bin may not be provided in the machine, or a conveyor may be positioned below the cutting chamber to transport materials away from the machine.

The industrial reducing machine 100 further includes a housing 118. The housing 118 comprises sidewalls 120 and bearing carriages 122. The hopper may be coupled (e.g., removably coupled) to the housing 118.

The bearing carriages 122 are designed to mate with bearings 124 coupled to the shaft 106. A bearing is provided at each end of the rotational shaft 106. However, additional bearings may be provided in the machine in other examples. The bearings 124 may be double acting tapered roller thrust bearings, in one example, to accommodate the large thrust loads experienced by the rotational shaft in certain applications. However, other types of bearings have been contemplated, such as a spherical roller thrust bearings, thrust ball bearings, ball bearings, magnetic bearings, etc.

The rotational shaft 106 may be partitioned into a drive end 126 and a non-drive end 128. The drive end 126 receives rotational input from the drive assembly 104. The non-drive end 128, conversely, does not receive direct rotational input from the drive assembly 104. However, machine configurations where both ends of the shaft are directly rotated by drive units have been contemplated. Nonetheless, in the illustrated configuration with a single drive end, the rotational shafts and cutter stack may be more efficiently installed, removed, and replaced. The drive end 126 is shown including a flange 130 which serves as an interface between the drive assembly 104 and the rotational shaft 106. However, other suitable shaft configurations may be used in other examples. The non-drive end 128 of the rotational shaft 106 may not include a flange, allowing for installation and removal of the cutter stack 110.

The cutter stack 110, rotational shaft 106, and/or cutter locking system 102 may conceptually be manufactured from a variety of suitable metals (e.g., steel, aluminum, titanium, combinations thereof, etc.) Nonetheless, in practice the blades may be manufactured from steel due to end-use design objectives related to cost, size, strength, and weight. Other components in the machine such as the housing 118 may also be constructed out of metal (e.g., steel, aluminum, titanium, combinations thereof, etc.,) in some examples. The metals may be heat treated and/or deburred during manufacturing, in some embodiments. Polymeric materials, composite materials, etc. may also be used to construct certain components in the reducing machine, such as components in the drive assembly.

FIG. 2 shows an example industrial reducing machine 200. The machine is shown in cross-section to reveal components in the machine. However, at least some of the components may at least partially circumferentially surround a rotational shaft 202. It will also be understood that the industrial reducing machine 200 shown in FIG. 2 is an example of the machine 100 illustrated in FIG. 1. As such, the machine 200 in FIG. 2 may include at least a portion of the components, component functionality, etc. of the machine 100 shown in FIG. 1, or vice versa.

The industrial reducing machine 200 includes the rotational shaft 202. The rotational shaft may receive rotational input from a drive assembly at a drive end as previously discussed. FIG. 2 specifically illustrates a non-drive end 204 of the shaft 202.

A bearing cover 206 is shown attached to a bearing flange 208 in a bearing 210. A bearing carriage 212 is shown housing the bearing 210. The bearing 210 is depicted as a double acting tapered roller thrust bearing. However, numerous suitable types of bearings have been contemplated, as previously discussed. The bearing carriage 212 is included in a housing 214 of the machine. The housing 214 is designed to secure and at least partially enclose at least a portion of the material reduction components in the machine 200.

A cutter stack 216, including a plurality of cutters 218 and spacers 220, is also depicted in FIG. 2. The cutter stack 216 may be removably attached to the rotational shaft 202. To elaborate, components of the cutter stack may not be welded or otherwise non-removably coupled to the rotational shaft 202. For instance, the cutters 218 and spacers 220 may slide (e.g., horizontally or vertically slide) on and off of the shaft. In this way, the machine's modularity is increased. The increased modularity, for example, allows the end user to tailor the machine for processing different materials or fine tune reduction operation according to changing reduction goals, requirements, etc.

A cutter locking system 222 designed to exert a preload on the cutter stack 216, is also illustrated. The cutter locking system 222 is coupled to a non-threaded portion of the shaft. Specifically, in one example, the cutter locking system 222 may be coupled to a cylindrical portion of the rotational shaft. Conversely, in such an example, the cutter stack 216 may be coupled to a polygonal shaped portion of the rotational shaft. In other instances, the cutter stack 216 may also be coupled to a cylindrical section of the shaft or the locking system may be coupled to a polygonal shaped section of the shaft.

The cutter locking system 222 includes a lock-ring 224 axially interfacing with a spacing plate 226. The lock-ring 224 sits in a lock-ring recess 228 in the rotational shaft 202 to limit axial movement of the lock-ring 224. Thus, the lock-ring 224 serves to delimit outward axial movement of components in the locking system 222 towards the bearing 210. The spacing plate 226 includes an indent 230 allowing a portion of the lock-ring to reside therein.

Attachment apparatuses 232 (e.g., bolts) are also shown extending through the spacing plate 226. The attachment apparatuses 232 may extend through the spacing plate 226 and enable a desired amount of spacing between the spring retainer 246 and the spacing plate to be maintained during installation of the locking system 222. It may be desirable to maintain separation between the spring retainer and the spacing plate in order to allow shims 234 to be inserted there between and allow the components to be efficiently installed.

The spacing plate 226 also includes openings 236 allowing heads 238 of bolts 240 to be accessed while tooling occurs. Thus, the openings 236 allow the bolts 240 be torqued to compress springs 250 during an initial stage of locking system installation. In a subsequent stage of locking system installation, the bolts may be unthreaded to release spring compression and allow the locking system to exert an axial preload on the cutter stack. For example, rotation of the bolts in a clockwise direction may induce compression of the springs 250 and rotation of the bolts in a counterclockwise direction may release spring compression or vice versa. In other examples, however, threading and unthreading the bolts may increase and decrease locking system preload on the cutter stack. Additionally, the opening 236 may be equally spaced around the spacing plate. In such an example, other openings in the locking system aligned with the openings 236 may be equally spaced with regard to the rotational axis 152.

Plugs may be placed in the openings 236 to decrease the likelihood of unwanted particulates entering the interior of the cutter locking system 222. However, in other examples, the plugs may be omitted from the assembly.

The shims 234 are shown positioned between the spacing plate 226 and a compression plate 242. In one example, four shims may be used in the locking system to enable efficient installation. However, systems with an alternate number of shims have been envisioned. The shims 234 allow the axial spacing in the locking system to be adjusted during installation to accommodate for manufacturing variances in the machine. To elaborate, the shims 234 allow the axial length of the cutter locking system 222 to be adjusted to achieve desired cutter stack preloading and spacing. As a result, the machine's adaptability is increased. The shims 234 include recesses 244 allowing the bolts 240 to pass there through. Additionally, the interface between the shim and the compression plates may serve as an indicator of an improperly spaced cutter stack. As such, if a gap exists between the shims and the spacing plate and/or compression plate, it may be ascertained that components in the cutter stack have become worn, are not in a desired alignment, etc. Conversely, when the shims are in contact with the compression plate and/or spacing plate, it may be ascertained that the cutter stack is aligned in a desired manner and the stack is preloaded as intended. Specifically, when axial surfaces 223 of the shims 234 are in contact with a surface 225 at one axial end of the compression plate 242, it may be determined that cutter stack is axially positioned as desired. In this way, the machine may be visually inspected for cutter stack wear. Machine operators can therefore efficiently inspect the locking system for wear and take corrective action (e.g., order machine repair) when wanted.

A spring retainer 246 is shown mated with the heads 238 of the bolts 240 and is positioned in an interior opening 248 of the compression plate 242. The compression plate 242 is adjacent to the cutter stack 216, in the depicted embodiment. However, an alternate spacing between the compression plate and the cutter stack may be utilized in other embodiments.

Springs 250 also reside in the interior openings 248 of the compression plate 242. The position of the springs in the interior openings enables the springs 250 to be protected from external particulates, thereby increasing the spring's lifespan. However, in other embodiments at least a portion of the spring may be positioned external to the compression plate 242. Surfaces 270 of the interior openings 248 of the compression plate 242 axially delimit corresponding ends of the springs 250. Interior surfaces 272 of the spring retainer 246 axially delimit the other corresponding ends of the springs 250. Thus, the springs 250 are axially delimited on opposing ends by the compression plate 242 and the spring retainer 246. As such, when the spring retainer and compression plate are axially moved towards one another, the springs are compressed. On the other hand, when the spring retainer and the compression plate are axially moved apart, the springs are uncompressed.

Each of the springs 250 include a plurality of Belleville washers in FIG. 2. Belleville washers may provide cost savings when compared to other types of springs, such as a nitrogen spring. Furthermore, the Belleville springs may be more durable than elastomeric or helical style springs. However, the machine may additionally, or alternatively, include other suitable types of springs, such as nitrogen springs, elastomeric springs, helical spring, or combinations thereof. The characteristics of the springs 250 may be adjusted to set a predetermined axial preload exerted by the locking system on the cutter stack, subsequent to installation of the system on the shaft 202. As described herein, a preload is a force applied in an axial direction.

The characteristics of the springs 250 may also be adjusted to vary the amount of spring deflection (e.g., axial compression) when the locking system is clamped-up. For example, multiple Belleville washers may be stacked to modify the spring constant and/or amount of spring deflection. Stacking the Belleville washers in a common direction increases the spring constant without varying the deflection. However, stacking the Belleville washers in alternating directions increases the spring's deflection without varying the spring constant. In some examples, the Belleville washers may be stacked in alternating as well as corresponding directions to allow both the spring constant and the axial deflection of the spring to be varied. The interior opening has a cylindrical shape to accommodate the cylindrical shape of the Belleville washer stack. However, other interior opening shapes that accommodate differently profiled springs may be used in other embodiments.

A threaded section 252 of the bolts 240 threads into threaded openings 254 in the compression plate 242. During the spring compression sequence in the cutter locking system 222, the bolts are threaded further into the compression plate 242, resulting in compression of the springs 250 via axial movement of the spring retainer 246 further into the interior openings 248 towards an axial end 256 the compression plate 242. To expound, the heads 238 of the bolts 240 push the spring retainer 246 toward the axial end 256 during spring compression. Thus, the springs 250 may be compressed by torqueing the bolts 240. A lip 258 in the interior opening of the compression plate 242 may limit the amount of spring compression. The spring retainer may therefore contact the lip 258 when a targeted amount of spring compression is achieved. In other examples, the springs may reach a desired amount of compression prior to the contact between the spring retainer 246 and the lip 258. In some instances, the amount of spring compression carried out during system installation may be less than a total amount of compression permitted by the springs. In alternate examples, the target amount of spring compression may be equivalent to the total amount of compression allowed by the springs.

During spring decompression in the cutter locking system 222, the bolts are unthreaded from the compression plate 242. During decompression, the spring retainer 246 axially translates away from the axial end 256 of the compression plate 242. When the springs 250 are released, the cutter stack is preloaded by the cutter locking system 222. The springs 250 may be decompressed, subsequent to installation of the locking system on the rotational shaft 202. In this way, the springs are compressed during locking system installation and then subsequently uncompressed to allow the system to achieve a targeted axial preload on the cutter stack. Consequently, the chance of unwanted movement of the components in the cutter stack is reduced. By compressing and decompressing the springs in this manner, the likelihood of the system exerting an unwanted axial preload on the cutter stack is reduced.

In other implementations, the locking system 222 may be designed such that threading and unthreading the bolts into the compression plate increases and decreases preload on the cutting stack. In such an example, the springs or other components may be designed to reduce the likelihood of (e.g., prevent) the locking system 222 exerting a preload on the cutter stack outside a desired range.

A cutting tray 260 is also shown in FIG. 2. The cutting tray 260 is attached to the housing 214 and is configured to interact with the cutters 218, resulting in material processing in the machine. The cutting tray 260 may therefore remain substantially stationary while the cutter shafts are rotated during material processing operation.

FIG. 3 shows a detailed illustration of the lock-ring 224. The lock-ring 224 is divided into a plurality of discrete sections 300, in the illustrated example, to allow the lock-ring 224 to be easily and efficiently installed. Specifically, in the illustrated example, the lock-ring 224 is divided into four sections. However, lock-rings with a greater or fewer number of discrete sections have been contemplated, such as lock-rings with six sections or a lock-ring which is formed as a single continuous shape. Gaps 303 are formed between the discrete sections 300 of the lock-ring 224. However, in other examples, the discrete sections may contact one another.

Each section 300 of the lock-ring 224 includes an interior surface 302 and an exterior surface 304, as well as side surfaces 306. When installed, the interior surface 302 is in the lock-ring recess 228 in the rotational shaft 202 shown in FIG. 2. Thus, the rotational shaft extends through a central opening 308 when the lock-ring is installed. Specifically, the discrete sections 300 may substantially surround the shaft. However, in other implementations, the discrete lock-ring sections may only circumferentially extend around a portion of the shaft.

FIG. 4 shows a cross-sectional view of the lock-ring 224 shown in FIG. 3. The lock-ring 224 may include an angled surface 400. The angled surface 400 allows the lock-ring to smoothly interface with the indent 230 in the spacing plate 226 shown in FIG. 2. The angled surface 400 is shown arranged at a non-straight angle 402, with a line parallel to the rotational axis 152. The angle 402 is 30° in the illustrated example. However, numerous suitable angles have been contemplated. The interior surface 302 and the exterior surface 304 of the lock-ring 224 are again shown along with a first axial side 404 and a second axial side 406 of the ring. The first axial side 404 is adjacent to the spacing plate 226, shown on FIG. 2 when installed. In some aspects, such an arrangement allows for the lock-ring to be held securely against the shaft 202 and provides a preload force against the spacing plate 226 sufficient to prevent longitudinal movement of the lock-ring 224.

FIG. 5 shows a first axial view of the spacing plate 226. The spacing plate 226 includes a central opening 500. The central opening 500 mates with the outer surface 203 of the rotational shaft 202 shown in FIG. 2.

The openings 236 allowing the bolts 240 shown in FIG. 2, to be accessed for tooling are depicted in FIG. 5. In this way, the bolts may be accessed and torqued to compress the springs and then subsequently unthreaded to decompress the spring and allow the locking system to preload the cutter stack. In the figure, the openings 236 are symmetrically arranged around the compression plate. However, other arrangements of the openings 236 have been contemplated. The diameter of each of the openings 236 varies along its axial length. In particular, the openings 236 each include a larger diameter section 502 and a smaller diameter section 504.

Outer openings 506 through which attachment apparatuses 232, shown in FIG. 2, extend, are illustrated in FIG. 5. Inner openings 508 are shown in FIG. 5. The inner openings 508 may have attachment apparatuses extending there through. The angular separation between the openings 236 and the outer openings 506 is indicated at 510. The angular separation between the openings 236 and the inner openings 508 is indicated at 512. The angular separation in both cases is 15°, in the illustrated example. However, numerous angular separation values may be used.

The spacing plate 226 includes an angled section 512 profiled to mate with the lock-ring 224. However, other plate profiles have been contemplated. For instance, the axial thickness may remain constant from an interior surface 514 to an exterior surface 516. Additionally, the interior surface 514 is adjacent to the outer surface 203 of the shaft 202, shown in FIG. 2.

FIG. 6 illustrates a second axial view of the spacing plate 226. Again, the openings 236 and the central opening 500 are illustrated.

FIG. 7 depicts a cross-sectional view of the spacing plate 226 depicted in FIG. 6. The larger diameter sections 502 and the smaller diameter sections 504 of the openings 236 are illustrated. The openings 236 are shown axially extending through the spacing plate 226, from a first axial side 700, to a second axial side 702. FIG. 7 shows the angled section 512 in spacing plate 226, designed to mate with the angled surface 400 of the lock-ring 224, shown in FIG. 4.

FIG. 8 shows a detailed view of one of the shims 234. The shim 234 includes an outer surface 800 and an inner surface 802. The inner surface 802 may be adjacent to the rotational shaft 202 in FIG. 2 and the outer surface 800 may be viewable from the outside to allow gaps between the shim and the compression plate to be easily viewed, as previously discussed.

The shim 234 includes recesses 244. The recesses 244 extend to the inner surface 802 to allow the shim to be installed subsequent to bolt installation. For instance, the shim 234 may be slid between the compression and spacing plates during installation. However, other recess profiles may be used, in other examples. The thickness of the shim or shim stack may be selected based on a desired axial length of the locking system 222. The shim or shim stack length may be selected, for example, during installation to accommodate for component manufacturing variances.

The shim 234 shown in FIG. 8 only partially surrounds the rotational shaft 202. In other examples, multiple shims may be installed on different sections around the shaft and may be spaced away from one another.

FIG. 9 shows a side view of the shim 234 and a first axial side 900 and a second axial side 902 of the shim. When installed, the first axial side 900 of the shim may be adjacent to the compression plate 242, shown in FIG. 2, and the second axial side 902 of the shim may be adjacent to the spacing plate 226. Therefore, the shim is axially interposed between the plates.

FIG. 10 shows an axial view of the spring retainer 246. The spring retainer 246 includes an inner surface 1000 adjacent to the rotational shaft 202, shown in FIG. 2, and an outer surface 1002 adjacent to an interior surface 227 of the compression plate 242, shown in FIG. 2. A central opening 1004 of the spring retainer 246 is illustrated in FIG. 10.

Openings 1006 mating with the heads 238 of the bolts 240, shown in FIG. 2, are depicted. The heads 238 exert an axial force on the spring retainer 246 when the bolts 240 are threaded into the compression plate 242. Openings 1008 in the spring retainer 246 are shown in FIG. 10. Attachment apparatuses 232, shown in FIG. 2, may mate with the openings 1008. However, in other examples, the openings may not be included in the spring retainer 246. As previously discussed, the attachment apparatuses 232 shown in FIG. 2, allow a targeted amount of axial spacing between the spacing plate, the compression plate, and the spring retainer 246 to be maintained while installing the locking system. However, the attachment apparatuses may be omitted from the system, in other embodiments. An angular separation between the openings 1006 and the openings 1008 is indicated at 1010.

FIG. 11 shows a first cross-sectional view of the spring retainer 246. The openings 1008 are again illustrated. FIG. 11 further shows a groove 1100 in an outer surface 1102 of the spring retainer. The groove 1100 may include a seal positioned therein. The seal (e.g., O-ring) may be designed to engage an interior surface 227 of the compression plate 242, shown in FIG. 2, to reduce the amount of unwanted particulates (e.g., material constituents from the reduction chamber) from traveling into the interior of the cutter locking system 222. As a result, the likelihood of component wear in the locking system is reduced.

FIG. 12 shows a second cross-sectional view of the spring retainer 246. The openings 1006 mating with the heads 238 of the bolts 240 shown in FIG. 2, are again illustrated. The groove 1100 in the outer surface 1102 of the spring retainer 246, is shown in FIG. 12.

FIG. 13 shows a first axial view of the compression plate 242. The interior openings 248 of the compression plate 242, are shown in FIG. 13. The interior openings retain the springs 250, shown in FIG. 2. Surfaces 270 of the interior openings 248, delimiting ends of the springs 250, shown in FIG. 2, are again depicted in FIG. 13.

The threaded openings 254 designed to threadingly engage with threads in the bolts 240, shown in FIG. 2, are depicted in FIG. 13. The bolts 240 thread and unthread from the threaded opening 254 during locking system installation and removal.

Openings 1300 in the compression plate 242 are shown in FIG. 13. The openings may receive an attachment apparatus. However, in other examples, the openings 1300 may be omitted from the compression plate 242.

The compression plate 242 includes a central opening 1302. The shaft 202, shown in FIG. 2, extends through the central opening 1302 when the locking system is installed in the machine. An interior surface 1304 and an exterior surface 1306 of the compression plate 242 are depicted in FIG. 13.

FIG. 14 shows a second axial view of the compression plate 242. The openings 1300, threaded openings 254, interior surface 1304, and exterior surface 1306 are again shown. The angular separation 1400 between the openings 1300 and the threaded openings 254 is indicated in FIG. 14. The angular separation is 15°, in the illustrated embodiment. However, other angular separations may be used.

FIG. 15 shows a cross-sectional view of the compression plate 242. The compression plate 242 may include an interior opening 1500 in which the spring retainer 246 may reside. When the locking system reaches a predetermined spring compression, the spring retainer contacts the lip 258. This prevents further compression of the springs 250. The interior openings 248 in which the springs 250, depicted in FIG. 2, reside as well as the threaded openings 254, are depicted in FIG. 15. The openings 1300 extending from a first axial side 1502 to a second axial side 1504 of the compression plate 242 are depicted in FIG. 15.

FIG. 16 shows an example of a cutter 1600. The cutter 1600 is an exemplary embodiment of one of the cutters 218, shown in FIG. 2. The cutter 1600 includes a polygonal interior opening 1602. The polygonal interior opening 1602 therefore includes faces 1603 in a polygonal arrangement. Specifically, in the illustrated example, the interior opening has a hexagonal shape. However, other shapes have been contemplated such as triangular shapes, square shapes, octagonal shapes, etc. In other implementations, the interior opening may have a regular shape, such as a round or oval shape with protruding keys that interact with corresponding depressions on the shaft. Such keys may be any shape generally used, including square, triangular, hexagonal, polygonal, and the like.

The cutter 1600 includes cutting blades 1604 with tips 1606. The blades 1604 are symmetrically arranged about a radial line of symmetry 1608. However, in other examples, the blades may have an asymmetric profile. For instance, the cutter may include a single blade.

The line of symmetry 1608 is arranged at a non-perpendicular angle, indicated at 1610, with regard to one of the faces 1603 in the interior opening 1602 and therefore faces 1700 in a polygonal outer surface 1702 in the rotational shaft 1704 shown in FIG. 17. Arranging the cutter in this manner increases the number of possible angular arrangement of the cutter, thereby increasing the machine's modularity. It will be appreciated that in certain circumstances it is desirable to avoid arranging two cutters at the same angle with regard to the rotational axis 152 to avoid overloading the shaft during reducing operation. Therefore, by increasing the number of distinct angles that the cutters can be arranged the number of cutters that can be placed on the shaft can be increased, if desired. Increasing the number of cutters on the shaft may allow a greater amount of material to be processed by the machine in some applications, thereby increasing the machine's profitability.

FIG. 17 shows an example of a rotational shaft 1704. The rotational shaft 1704 is an example of the rotational shaft 202 shown in FIG. 2. The rotational shaft 1704 includes a polygonal outer surface 1702 with faces 1700 that mate with the polygonal interior opening 1602 of the cutter 1600, shown in FIG. 16. An unthreaded cylindrical section 1706 of the rotational shaft 1704, is depicted in FIG. 17. A cutter locking system may be attached to the cylindrical section 1706.

FIGS. 18-19 show a use case locking system installation sequence in an industrial machine 1800. The locking system in the machine shown in FIGS. 18 and 19 may include similar features to the locking systems and industrial machines described above with regard to FIGS. 1-17 or vice versa.

Turning to FIG. 18, a locking system 1801 including a compression plate 1802, a spacing plate 1804, and lock ring segments 1806 mated with a groove 1808 in a rotational shaft 1810 is illustrated. It will be understood that springs and a retainer plate are positioned in the interior of the compression plate 1802 and are therefore hidden from view in FIG. 18. At the step in locking system installation, depicted in FIG. 18, a gap 1812 between the compression plate 1802 and the spacing plate 1804 exists.

FIG. 19 shows shims 1900 placed in the gap 1812 between the spacing plate 1804 and the compression plate 1802 of the locking system 1801. This allows the axial spacing of the locking system 1801 to be fine-tuned during installation, enabling the locking system to achieve a targeted spacing between the locking assembly and the cutter stack 1902. Subsequent to shim and lock ring installation, the springs in the locking system 1801 may be accessed via openings 1904 and unthreaded to allow the locking assembly to exert the preload on the cutter stack 1902.

FIGS. 1-19 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially, similar, and/or identical" differ from one another according to manufacturing tolerances (e.g., within 1-5% deviation). Furthermore, as describe herein "approximately" refers to a deviation by 5% or less, unless otherwise noted.

FIG. 20 shows a method 2000 for installing a locking system on a shaft of an industrial reducing machine. The installation method 2000 may be carried out via the industrial reducing machines and corresponding components discussed above with regard to FIGS. 1-19, in one example. However, in other examples, the method 2000 may be implemented via other suitable industrial reducing machines and components. The method steps may be at least partially implemented as instructions stored in memory executable by a processor. However, it will be appreciated that in some examples, steps such as rotating the bolt to compress the spring may be manually carried out by installation personnel.

At 2002, the method includes installing the cutter stack on the rotational shaft. For example, the cutters, spacers, etc. may be slid onto the shaft. Next at 2004, the method includes initiating installation of the locking system on the rotational shaft. For example, the compression plate, springs, and spring retainer of the locking system may be placed on an end (e.g., non-drive side) of the shaft.

Next at 2006, the method includes torqueing the bolt in the locking system to compress the springs. To elaborate, the bolts may be threaded into the compression plate to allow the spring retainer to axially translate toward the compression plate and induce spring compression. At 2008, the method includes completing locking system installation on the rotational shaft. The shims, for example, may be inserted between the compression and spacing plate, and the locking ring may be mated with the groove in the rotational shaft.

At 2010, the method includes releasing the compression of the spring to exert an axial preload on the cutter stack on the rotational shaft. Releasing spring compression may involve unthreading the bolts from the compression plate to allow the spring retainer to axially translate away from the compression plate. Method 2000 allows the cutter stack to be preloaded to reduce the chance of the cutter stack developing play and degrading the cutter, spacers, reduction operation, etc. Furthermore, the chance of the locking system exerting an unwanted preload on the cutter stack is reduced when the spring is first compressed and then released to induce preloading of the cutter stack. As a result, the likelihood of improper locking system installation is reduced.

The specific routines described herein may represent one or more of any number of installation strategies. As such, various actions, operations, and/or functions illustrated may be performed in the sequence illustrated, in parallel, or in some cases omitted. Likewise, the order of installation is not necessarily required to achieve the features and advantages of the example embodiments described herein, but is provided for ease of illustration and description. Further, one or more of the illustrated actions, operations and/or functions may be repeatedly performed depending on the particular strategy being used.

The configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

The invention will further be described in the following paragraphs. In one aspect, an industrial reducing machine is provided that comprises: a lock-ring positioned in a lock-ring recess in a rotational shaft; a compression plate with a threaded opening; a bolt designed to threadingly engage with the threaded opening in the compression plate; a spring including a first end axially delimited by a surface in the compression plate; and a spring retainer axially delimiting a second end of the spring.

In another aspect, a method for operating an industrial reducing machine is provided that comprises: exerting an axial preload on a cutter stack attached to a rotational shaft via a cutter locking system, where the cutter stack includes a plurality of cutters and where the cutter locking system comprises: a lock-ring positioned in a lock-ring recess in the rotational shaft; a spacing plate axially interfacing with the lock-ring; a compression plate with a threaded opening; a bolt designed to threadingly engage with the threaded opening in the compression plate; and a spring exerting the axial preload on the cutter stack through the compression plate. In one example, the method may further comprise, prior to exerting the axial preload on the cutter stack, torqueing the bolt to compress the spring. In another example, the method may further comprise, prior to exerting the axial preload on the cutter stack and subsequent to torqueing the bolt, unthreading the bolt to release the spring compression. In yet another example, the method may further comprise rotating the bolt in a direction until the axial preload reaches a threshold value.

In another aspect, a locking system in an industrial reducing machine is provided that comprises: a rotational shaft; a cutter stack attached to the rotational shaft and including a plurality of cutters; a cutter locking system designed to exert an axial preload on the cutter stack and positioned on an unthreaded section of the rotational shaft, the cutter locking system including: a lock-ring positioned in a lock-ring recess in the rotational shaft; a spacing plate axially interfacing with the lock-ring; a compression plate with a threaded opening; a bolt designed to threadingly engage with the threaded opening in the compression plate; and a spring axially interposed between the spacing plate and the compression plate.

In any of the aspects or combinations of the aspects, a head of the bolt may be mated with an opening in the spring retainer and in an installation sequence, the bolt may be torqued to induce compression of the spring and subsequently unthreaded to allow the locking system to exert an axial preload on a cutter stack mounted on the rotational shaft.

In any of the aspects or combinations of the aspects, the spring may include one or more Belleville washers.

In any of the aspects or combinations of the aspects, the industrial reducing machine may further comprise a shim axially positioned between the spacing plate and the compression plate.

In any of the aspects or combinations of the aspects, the shim and the spacing plate may each include an opening with a diameter larger than a head of the bolt.

In any of the aspects or combinations of the aspects, the industrial reducing machine may further comprise a spring retainer positioned in an interior opening in the compression plate, the interior opening may at least partially enclose the spring and the spring retainer may axially delimit an end of the spring.

In any of the aspects or combinations of the aspects, a seal may be provided at an interface between the spring retainer and an interior surface of the compression plate.

In any of the aspects or combinations of the aspects, in a preload configuration, the spring may exert an axial preload on the cutter stack.

In any of the aspects or combinations of the aspects, the rotational shaft may have a polygonal outer surface in radial cross-section, with a plurality of faces and each of the plurality of cutters may include a polygonal interior surface in radial cross-section mating with the polygonal outer surface of the rotational shaft.

In any of the aspects or combinations of the aspects, each of the plurality of cutters may be symmetric about a radial line of symmetry, and the radial line of symmetry may be arranged at a non-perpendicular angle with regard to the one of the plurality of faces.

In any of the aspects or combinations of the aspects, the industrial reducing machine may further comprise a bearing coupled to the rotational shaft at a non-drive end of the rotational shaft and, the cutter locking system may be positioned axially between the cutter stack and the bearing.

In any of the aspects or combinations of the aspects, the locking system may further comprise a shim axially positioned between the spacing plate and the compression plate and a spring retainer positioned in an interior opening in the compression plate, the interior opening may at least partially enclose the spring and the spring retainer may axially delimit an end of the spring.

In any of the aspects or combinations of the aspects, when the axial preload reaches a threshold value the compression plate may axially contact the spring retainer.

In any of the aspects or combinations of the aspects, the rotational shaft may have a polygonal outer surface in radial cross-section with a plurality of faces and each of the plurality of cutters may include a polygonal interior surface in radial cross-section mating with the polygonal outer surface of the rotational shaft, each of the plurality of cutters may be symmetric about a radial line of symmetry, and the radial line of symmetry may be arranged at a non-perpendicular angle with regard to the one of the plurality of faces.

In any of the aspects or combinations of the aspects, a head of the bolt may be mated with an opening in the spring retainer and during compression of the spring in a locking system installation process, rotation of the bolt in a direction may cause the compression plate to axially translate towards the spacing plate.

In any of the aspects or combinations of the aspects, the spring may include a plurality of axially aligned Belleville washers.

In any of the aspects or combinations of the aspects, the cutter assembly may further comprise a seal sealing an interface between the spring retainer and an interior surface of the compression plate.

In any of the aspects or combinations of the aspects, each of the plurality of cutters may be symmetric about a line of symmetry, and the line of symmetry may be arranged at a non-perpendicular angle with regard to the one of the plurality of faces.

In any of the aspects or combinations of the aspects, the rotational shaft may have a polygonal outer surface in radial cross-section with a plurality of faces, and each of the plurality of cutters may include a polygonal interior surface in radial cross-section mating with the polygonal outer surface of the rotational shaft, each of the plurality of cutters may be symmetric about a radial line of symmetry, and the radial line of symmetry may be arranged at a non-perpendicular angle with regard to the one of the plurality of faces.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

Those skilled in the art will recognize that it is common within the art to describe devices and/or processes in the fashion set forth herein, and thereafter use standard engineering practices to integrate such described devices and/or processes into larger systems.

Embodiments of methods and systems for industrial reducing machines have been described. The following claims are directed to said embodiments, but do not preempt creating industrial reducing machines in the abstract. Those having skill in the art will recognize numerous other approaches to creating industrial reducing machines, precluding any possibility of preemption in the abstract. The terms used in the appended claims are defined herein with the proviso that the claim terms may be used in a different manner if so defined by express recitation.

The invention claimed is:

1. An industrial reducing machine comprising:
a rotational shaft;
a cutter stack attached to the rotational shaft and including a plurality of cutters;
a cutter locking system designed to exert an axial preload on the cutter stack and positioned on an unthreaded section of the rotational shaft, the cutter locking system including:
a lock-ring positioned in a lock-ring recess in the rotational shaft;
a spacing plate axially interfacing with the lock-ring;
a compression plate with a threaded opening;
a bolt designed to threadingly engage with the threaded opening in the compression plate; and
a spring axially interposed between the spacing plate and the compression plate.

2. The industrial reducing machine of claim 1, where the spring includes one or more Belleville washers.

3. The industrial reducing machine of claim 1, further comprising a shim axially positioned between the spacing plate and the compression plate.

4. The industrial reducing machine of claim 3, where the shim and the spacing plate each include an opening with a diameter larger than a head of the bolt.

5. The industrial reducing machine of claim 1, further comprising a spring retainer positioned in an interior opening in the compression plate, where the interior opening at least partially encloses the spring and where the spring retainer axially delimits an end of the spring.

6. The industrial reducing machine of claim 5, where a seal is provided at an interface between the spring retainer and an interior surface of the compression plate.

7. The industrial reducing machine of claim 5, where in a preload configuration the spring exerts the axial preload on the cutter stack.

8. The industrial reducing machine of claim 1, where the rotational shaft has a polygonal outer surface in radial cross-section with a plurality of faces and where each of the plurality of cutters include a polygonal interior surface in radial cross-section mating with the polygonal outer surface of the rotational shaft.

9. The industrial reducing machine of claim 8, where each of the plurality of cutters is symmetric about a line of symmetry and where the line of symmetry is arranged at a non-perpendicular angle with regard to the one of the plurality of faces.

10. The industrial reducing machine of claim 1, further comprising a bearing coupled to the rotational shaft at a non-drive end of the rotational shaft and where the cutter locking system is positioned axially between the cutter stack and the bearing.

11. A method for an industrial reducing machine, comprising:
    exerting an axial preload on a cutter stack attached to a rotational shaft via a cutter locking system, where the cutter stack includes a plurality of cutters and where the cutter locking system comprises:
        a lock-ring positioned in a lock-ring recess in the rotational shaft;
        a spacing plate axially interfacing with the lock-ring;
        a compression plate with a threaded opening;
        a bolt designed to threadingly engage with the threaded opening in the compression plate; and
        a spring exerting the axial preload on the cutter stack through the compression plate;
    where the cutter locking system further comprises a shim axially positioned between the spacing plate and the compression plate and a spring retainer axially delimiting an end of the spring positioned in an interior opening in the compression plate, and where the interior opening at least partially encloses the spring.

12. The method of claim 11, further comprising, prior to exerting the axial preload on the cutter stack, torqueing the bolt to compress the spring.

13. The method of claim 12, further comprising, prior to exerting the axial preload on the cutter stack and subsequent to torqueing the bolt, unthreading the bolt to release the spring compression.

14. The method of claim 11, where the axial preload correlates to the spring constant of the spring.

15. The method of claim 11, where the rotational shaft has a polygonal outer surface in radial cross-section with a plurality of faces and where each of the plurality of cutters include a polygonal interior surface in radial cross-section mating with the polygonal outer surface of the rotational shaft, where each of the plurality of cutters is symmetric about a radial line of symmetry, and where the radial line of symmetry is arranged at a non-perpendicular angle with regard to the one of the plurality of faces.

* * * * *